J. GALIPEAU.
PAPER MAKING MACHINE.
APPLICATION FILED MAY 12, 1917.
1,266,673.
Patented May 21, 1918.
2 SHEETS—SHEET 1.
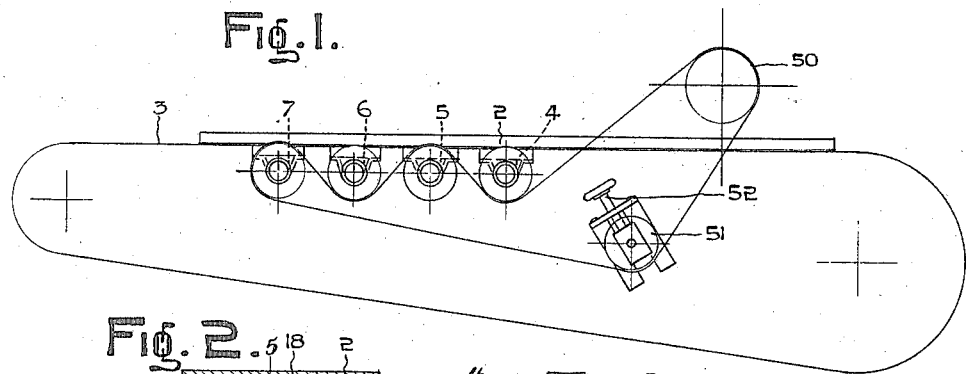
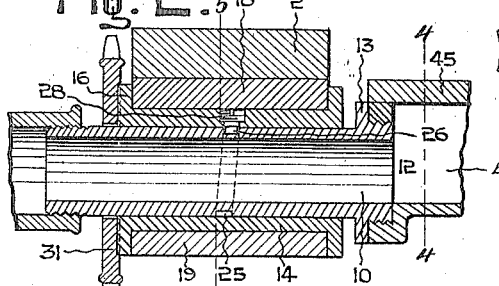
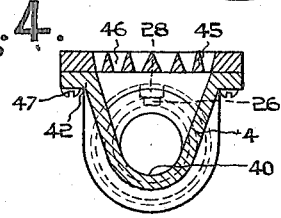
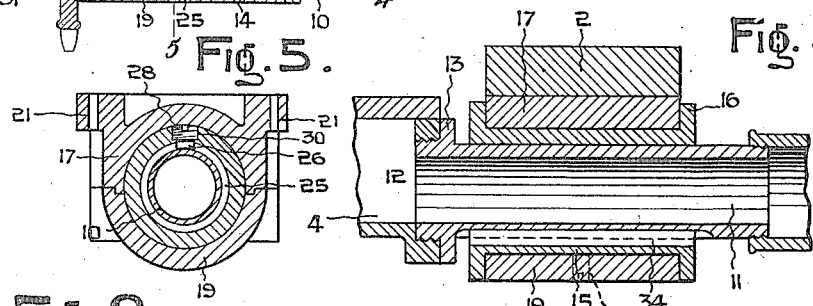
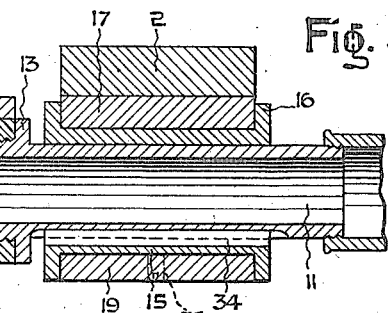
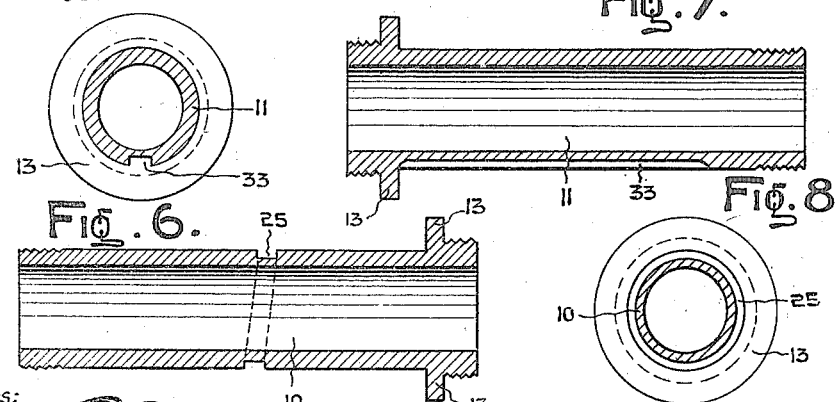
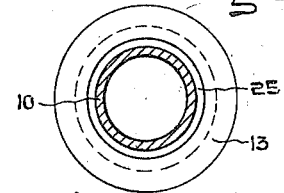
John Galipeau
Inventor J. GALIPEAU.
PAPER MAKING MACHINE.
APPLICATION FILED MAY 12, 1917.
1,266,673.
Patented May 21, 1918.
2 SHEETS—SHEET 2.
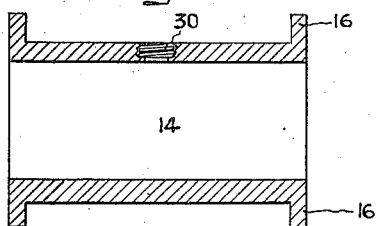
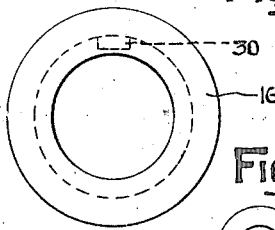
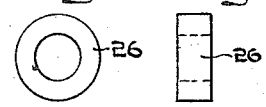
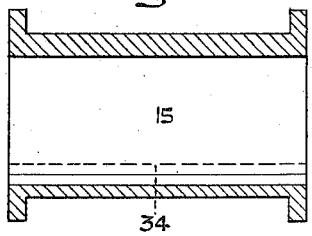
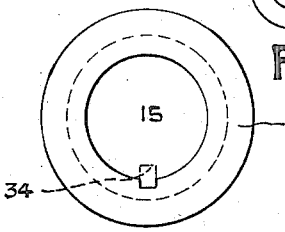
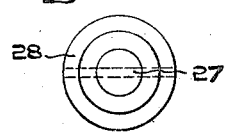
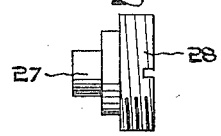
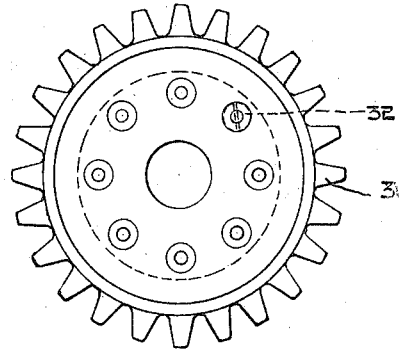
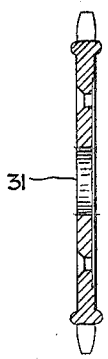
Witnesses:
John Galipeau, Inventor
per Attorney

UNITED STATES PATENT OFFICE.

JOHN GALIPEAU, OF MONTREAL, QUEBEC, CANADA, ASSIGNOR OF ONE-HALF TO JOHN H. GARTH, OF MONTREAL, QUEBEC, CANADA.

PAPER-MAKING MACHINE.

1,266,673.

Specification of Letters Patent.

Patented May 21, 1918.

Application filed May 12, 1917. Serial No. 168,322.

*To all whom it may concern:*

Be it known that I, JOHN GALIPEAU, of the city of Montreal, Province of Quebec, Dominion of Canada, have invented certain new and useful Improvements in Paper-Making Machines; and I do hereby declare that the following is a full, clear, and exact description thereof.

My invention relates particularly to the manufacture of paper from short fiber wood pulp, and has reference more particularly to the machines in which a preliminary drying of the pulp in sheet form takes place. These machines comprise a traveling screen of very fine wire mesh upon which the wet wood pulp fiber is deposited in a film-like layer or sheet; the screen thus charged being dragged over suction devices by means of which a more or less large amount of the water content of the pulp is removed. The devices commonly used for this purpose are fixed suction boxes the suction side of each of which has a wooden cover-plate formed with a series of suction ports. The idea of having the tops of the suction boxes of softer material than the screen is that wear of and damage to the screen is reduced; but the uneven wear of the warp strands of the screen on the cover plates causes projections to rise which frequently catch the warp strands and break them, thus causing holes in the screen. The damage must be repaired as soon as discovered to prevent sections of the pulp sheet from being drawn through the holes and corresponding holes formed in the sheet. This defect has been the cause of considerable loss in the wood-pulp paper industry, and to solve the problem is the object of my invention.

To this end I have combined with the boxes, means for reciprocating them transversely to the direction of travel of the screen; means whereby the reciprocation of the boxes, when more than one are used, may be varied to work in regular succession, or other desired order; means for maintaining the boxes in fixed angular position during reciprocation; and means for effecting an angular adjustment of each box to bring its suction face into juxtaposition with the screen. This new combination of parts solves the problem by reducing the wear on the screen to a minimum owing to the fact that the wear is distributed uniformly over the entire surface, this being due to reciprocation. The greater uniformity of suction throughout the area of the box or boxes is obtained by the uniform bearing of the screen which is secured by the adjustment to correct juxtaposition.

For full comprehension, however, of my invention, reference must be had to the accompanying drawings in which similar reference characters indicate the same parts, and wherein:

Figure 1 is a diagrammatic side elevation of my apparatus and the screen to which it is applied;

Fig. 2 is a vertical axial sectional view of one end of one of the boxes;

Fig. 3 is a similar view of the opposite end of the box;

Fig. 4 is a transverse vertical sectional view taken on line 4—4 Fig. 2;

Fig. 5 is a similar view to Fig. 4 taken on line 5—5 Fig. 2;

Figs. 6 and 7 are vertical axial sectional views of the trunnions at the opposite ends of each box;

Figs. 8 and 9 are elevations of the ends of the trunnions by which the attachment thereof to the boxes is effected;

Figs. 10 and 11 are vertical axial sectional views of the bushings in which the respective trunnions are journaled;

Figs. 12 and 13 are end views of the said bushings;

Fig. 14 is a face view of the driving sprocket-wheel with which each box is equipped;

Fig. 15 is a diametrical vertical sectional view of the sprocket-wheel;

Figs. 16 and 17 are end and side elevations respectively, of the arbor for the trundle-roll forming a part of the reciprocating mechanism; and Figs. 18 and 19 are similar views of the trundle-roll.

The water-extracting machine to which my invention is applied is a well known part of the paper machines commonly used in the wood-pulp industry, and for this reason I have indicated diagrammatically those parts, only, thereof which are essential to the full disclosure of the application of my invention. These parts comprise the usual rails 2 and fine mesh wire screen 3, the latter being caused by well known means to travel across and in bearing relation with the tops of a series of suction boxes 4, 5, 6 and 7. The relative positions of these parts are indicated in Fig. 1.

According to my invention the boxes are reciprocated and for this purpose, in this embodiment of my invention, hollow trunnions 10 and 11 are rigidly fastened in the open ends 12 of each box by having one end screw-threaded and formed with a collar 13 the open ends of the box being correspondingly screw-threaded and having these ends of the trunnions screwed therein, the collars limiting the extent to which they enter, and at the same time sealing the joint. These trunnions are journaled in a pair of brass bushings 14 and 15 flanged at their opposite ends as at 16 and carried in pillow-blocks 17 and 18 with caps 19. These pillow-blocks have flanges 20 and lugs 21 by which they are fastened to the underside of the rail 2 of which there are a pair located at the margins of the screen. Reciprocation is imparted to each box through trunnion 10 by means of a cam-groove 25 cut in the perimeter thereof which is engaged by a trundle-roll 26 carried by an arbor 27 the butt 28 of which is enlarged and screw-threaded and screwed into a tapped hole 30 in bushing 14; while the latter is rotated by a sprocket-wheel 31 fastened to its outer end by screws 32 or other suitable means. Upon rotation of this sprocket-wheel the bushing rotates with it and the trundle-roll travels around the cam-groove and axial reciprocal movement is imparted to the trunnion by the throw of the cam. In order to secure this action the trunnion must be prevented from rotating and this is effected through the box and trunnion 11 by forming the latter with a groove 33 which is slidably engaged by a feather or key 34 set rigidly in the bushing 15. This feature permits trunnion 11, and through it the box and trunnion 10, to reciprocate axially and at the same time prevent it from rotating.

In order to adjust the angular position of the box to set its suction face in juxtaposition with the screen the bushing 15 has a set-screw 36 carried by the cap 19 of pillow-block 17 which affords means for locking the bushing in any angular position to which it may be adjusted in its pillow-block.

In order to obtain maximum efficiency from the suction force each box is made with a curved bottom 40 having substantially the same radius as the trunnions, as shown clearly in Figs. 2, 3 and 4, and its sides are flared and flanged as at 42; the flanges affording flat bearing surfaces to facilitate the fastening thereto of the wooden suction plate. This suction plate is indicated at 45 and it has a series of upwardly flared suction ports 46. The cover is fastened in place by screws 47 or other suitable means.

In order to obtain uniformity of wear on all points of the screen I prefer to employ four of my reciprocating boxes. They are arranged parallel to each other and transversely to the screen. They are driven by an endless chain looped alternately under and over successive sprocket-wheels, over a driving sprocket 50 on any convenient driving shaft of the machine and over an adjusting sprocket 51 adjusted by a screw 52 or other suitable means to take up the slack in the chain.

*Operation.*

The bushings 14 of the several boxes should be set in proper relative positions to cause the boxes to move in regular succession across the screen to insure uniformity of wear on all points of the latter.

As the paper-machine is operated the chain is driven and the boxes are put in action. Owing to its uniform bearing over the complete suction area the screen causes uniform wear and obviates the formation of any projections such as splinters and the like in the surface of the wood of the suction plates. In fact the effect is that these suction plates become polished and the surface improves in smoothness the longer the apparatus is in use.

The suction device, which may be of any usual type, is connected by large pipes 75 to the free ends of both trunnions of each box; or if desired one suction branch only may be used for each box, the trunnion at the opposite end in that case being closed by a cap or block.

What I claim is as follows:—

1. In a paper-making machine of the type described the combination with a traveling screen and a suction box acting upon the screen and having its suction connection at one end; of means combined with the suction connection whereby the box is reciprocated across the direction of travel of the screen.

2. In a paper-making machine of the type having a traveling screen, and a suction box having open ends and supported in juxtaposition with the screen, the combination with the suction box; of bearings, bushings in the bearings, hollow trunnions fastened to and communicating with the open ends of the box and journaled slidably in the bushings; means preventing rotation of the trunnions; and means for reciprocating the box, substantially as described.

3. In a paper-making machine of the type having a traveling screen, rails at the margin of the screen and a suction box having open ends and supported in juxtaposition with the screen, the combination with the rails and suction box, of pillow-blocks carried by the rails; bushings in the pillow-blocks; hollow trunnions fastened to and communicating with the open ends of the box and journaled slidably in the bushings; means preventing rotation of the trunnions; and means for reciprocating the box, substantially as described.

4. In a paper-making machine of the type having a traveling screen, rails at the margin of the screen and a suction box having open ends and supported in juxtaposition with the screen; the combination with the rails and suction box, of pillow-blocks carried by the rails; bushings in the pillow-blocks; hollow trunnions fastened to and communicating with the open ends of the box and journaled slidably in the bushings; means preventing rotation of the trunnions; and means whereby the box is adjusted relatively to the screen, and means for reciprocating the box, substantially as described.

5. In a paper-making machine of the type having a traveling screen and a suction box supported in juxtaposition with the screen, the combination with the suction box; of bearings, bushings in the bearings, one of the bushings carrying a trundle-roll on its inside and the corresponding trunnion having a cam-groove engaged by the trundle roll, and means for rotating the bushing, trunnions fastened to the open ends of the box and journaled slidably in the bushings, means preventing rotation of the trunnions and means for exerting suction within the box.

6. In a paper-making machine of the type having a traveling screen, rails at the margin of the screen and a suction box having open ends and supported in juxtaposition with the screen, the combination with the rails and suction box, of pillow-blocks carried by the rails; bushings in the pillow-blocks one of the bushings carrying a trundle-roll on its inside and the corresponding trunnion having a cam-groove engaged by the trundle roll, a sprocket-wheel mounted rigidly on one end of the bushing and means for rotating the sprocket-wheel; hollow trunnions fastened to and communicating with the open ends of the box and journaled slidably in the bushings; and means preventing rotation of the trunnions, substantially as described.

7. In a paper-making machine of the type having a traveling screen, rails at the margin of the screen and a suction box having open ends and supported in juxtaposition with the screen, the combination with the rails and suction box, of pillow-blocks carried by the rails; bushings in the pillow-blocks, one of the bushings carrying a trundle-roll on its inside and the corresponding trunnion having a cam-groove engaged by the trundle-roll, a sprocket-wheel mounted rigidly on one end of the bushing and means for rotating the sprocket-wheel; hollow trunnions fastened and communicating with the open ends of the box and journaled slidably in the bushings; means for preventing rotation of the trunnions; and means whereby the box is adjusted relatively to the screen, substantially as described.

8. In a paper-making machine of the type having a traveling screen, rails at the margin of the screen and a suction box having open ends and supported in juxtaposition with the screen, the combination with the rails and suction box, of pillow-blocks carried by the rails; bushings in the pillow-blocks, one of the bushings carrying a trundle-roll on its underside and the corresponding trunnion having a cam-groove engaged by the trundle-roll, a sprocket-wheel mounted rigidly on one end of the bushing and means for rotating the sprocket-wheel, and the other bushing having a feather or key and the trunnion corresponding to this last-mentioned bushing having a groove with which the feather or key slidably engages; hollow trunnions fastened to and communicating with the open ends of the box and journaled slidably in the bushings; means preventing rotation of the trunnions; and means for reciprocating the box, substantially as described.

In testimony whereof I have signed my name to this specification in the presence of two witnesses.

JOHN GALIPEAU.

Witnesses:
GORDON C. COOKE,
WILLIAM J. C. HEWETSON.

Copies of this patent may be obtained for five cents each, by addressing the "Commissioner of Patents, Washington, D. C."